United States Patent [19]

Junkel

[11] Patent Number: 5,392,695

[45] Date of Patent: Feb. 28, 1995

[54] AUTOMATIC BREADMAKING MACHINE

[75] Inventor: Eric F. Junkel, Mount Prospect, Ill.

[73] Assignee: Circulair, Inc., Niles, Ill.

[21] Appl. No.: 223,455

[22] Filed: Apr. 5, 1994

[51] Int. Cl.$^6$ .......................... A21D 8/00; A47J 27/00; B28C 1/16; B29B 1/06

[52] U.S. Cl. ........................................ 99/328; 99/335; 99/348; 99/468; 366/98; 366/145; 366/146

[58] Field of Search ........................... 99/325–328, 99/331–335, 348, 467, 468, 483, 484, 486; 366/96–98, 69, 144–146, 149, 341, 314, 601; 426/27, 504, 512; 364/400

[56] References Cited

U.S. PATENT DOCUMENTS

| | | |
|---|---|---|
| D. 328,687 | 8/1992 | Dornbush et al. |
| 3,739,902 | 6/1973 | Ingram et al. |
| 3,779,363 | 12/1973 | Elson et al. |
| 4,234,605 | 11/1980 | Takeuchi |
| 4,663,506 | 5/1987 | Bowen et al. |
| 4,761,295 | 8/1988 | Casey |
| 4,762,057 | 8/1988 | Hirota et al. ............................ 99/328 |
| 4,817,509 | 4/1989 | Erickson |
| 4,836,683 | 6/1989 | Aoyama ................................ 366/98 |
| 4,844,048 | 7/1989 | Aruga et al. ........................... 99/348 |
| 4,870,896 | 10/1989 | Asahina et al. ....................... 99/348 |
| 4,903,588 | 2/1990 | Horiuchi et al. ...................... 99/468 |
| 4,903,589 | 2/1990 | Aoyama |
| 4,951,559 | 8/1990 | Arao et al. ............................ 366/146 |
| 4,957,040 | 9/1990 | Nakakura et al. ..................... 99/331 |
| 4,984,512 | 1/1991 | Takahashi et al. .................... 99/327 |
| 5,048,402 | 9/1991 | Letournel et al. .................... 366/314 |
| 5,076,153 | 12/1991 | Takahashi et al. .................... 366/601 |
| 5,280,150 | 1/1994 | Arai et al. ............................. 366/98 |

FOREIGN PATENT DOCUMENTS 8809640 12/1988 WIPO ................................... 99/348

OTHER PUBLICATIONS

DAK Catalog Adv. for Turbo Baker V, Mar. 23, 1994.

*Primary Examiner*—Timothy F. Simone
*Attorney, Agent, or Firm*—Gifford, Groh, Sprinkle, Patmore and Anderson

[57] ABSTRACT

An improved breadmaking machine for adjusting at least one operating parameter of the machine in response to the atmospheric pressure and atmospheric temperature existing outside the machine. Signals representative of the atmospheric pressure and atmospheric temperature are inputted to the breadmaker by a sensor, potentiometer, switch block assembly, or by manual entering means. The signals are read by a controller which initiates a program to determine at least one correction value for adjusting the operating parameters of the machine in response to the pressure and temperature inputs. The controller is connected to the parameters, such as a heater element, kneading motor and blower motor and adjusts the operation of the parameters according to the calculated values of the program.

12 Claims, 7 Drawing Sheets

AUTOMATIC BREADMAKING MACHINE

BACKGROUND OF THE INVENTION

I. Field of the Invention

The present invention relates generally to automatic breadmaking machines and, more particularly, to an automatic breadmaking machine with adjustment means for adjusting the baking temperature, baking time and rise time in response to the atmospheric pressure and atmospheric temperature external to the breadmaking machine.

II. Description of the Prior Art

Automatic breadmaking machines are known in the art which are capable of kneading, baking and rising bread and other types of bakery products. Conventional breadmakers may now be completely automatic requiring no decision-making about the kneading, baking and rising steps. Such breadmakers may also provide for manual operation, whereby the user decides how long the dough should be kneaded, left to rise and be baked.

Conventional breadmakers provide means for measuring and controlling internal temperature adequately, but do not adjust the operation of the breadmaker in response to changes in the atmospheric pressure, which varies by altitude, and also by the atmospheric temperature. Optimum baking times and temperatures can vary significantly for higher-altitude kitchens. For example, a bundt-style cake requires a 25° F. increase (for example from 350° F. to 375° F.) in baking temperature and a 10 minute reduction in baking time (from 45 to 35 minutes) at 4,000 feet compared to sea level. The rise time necessary to raise the bread or cake is also affected by the starting temperatures of the materials and the ambient temperature surrounding the breadmaking machine.

Up until now, extensive manual experimentation of baking time and baking temperature was required for manual breadmakers in order to compensate for the ambient temperature and pressure differentials existing at differing altitudes. Also, for automatic breadmakers, poorly baked bread would often be produced.

SUMMARY OF THE PRESENT INVENTION

The present invention is an improved automatic breadmaking machine which adjusts the operating parameters of the breadmaking machine in response to the atmospheric pressure and the atmospheric temperature existing external to the machine. A microprocessor/controller is built into the breadmaking machine and receives a first input signal which is representative of the atmospheric temperature and a second input signal representative of the atmospheric pressure surrounding the machine. The temperature and pressure inputs can be detected and read directly by the microprocessor utilizing potentiometers, sensors or a switch block assembly. The inputs may also be manually entered by the user from a keyboard/display mounted to the breadmaker.

The controller outputs at least one signal for controlling the operation of one or more of the operational parameters of the breadmaking machine. These parameters include the heater element for creating the desired temperature within the baking enclosure of the machine, the drive motor for operating the kneading bar and the blower motor for operating the blower which distributes the generated heat equally and evacuates trapped steam.

BRIEF DESCRIPTION OF THE DRAWING

Reference is made to the attached drawing, when read in conjunction with the following specification, wherein like reference numerals refer to like parts throughout the several views, and in which.

DESCRIPTION OF THE PREFERRED EMBODIMENT

Figure 1:
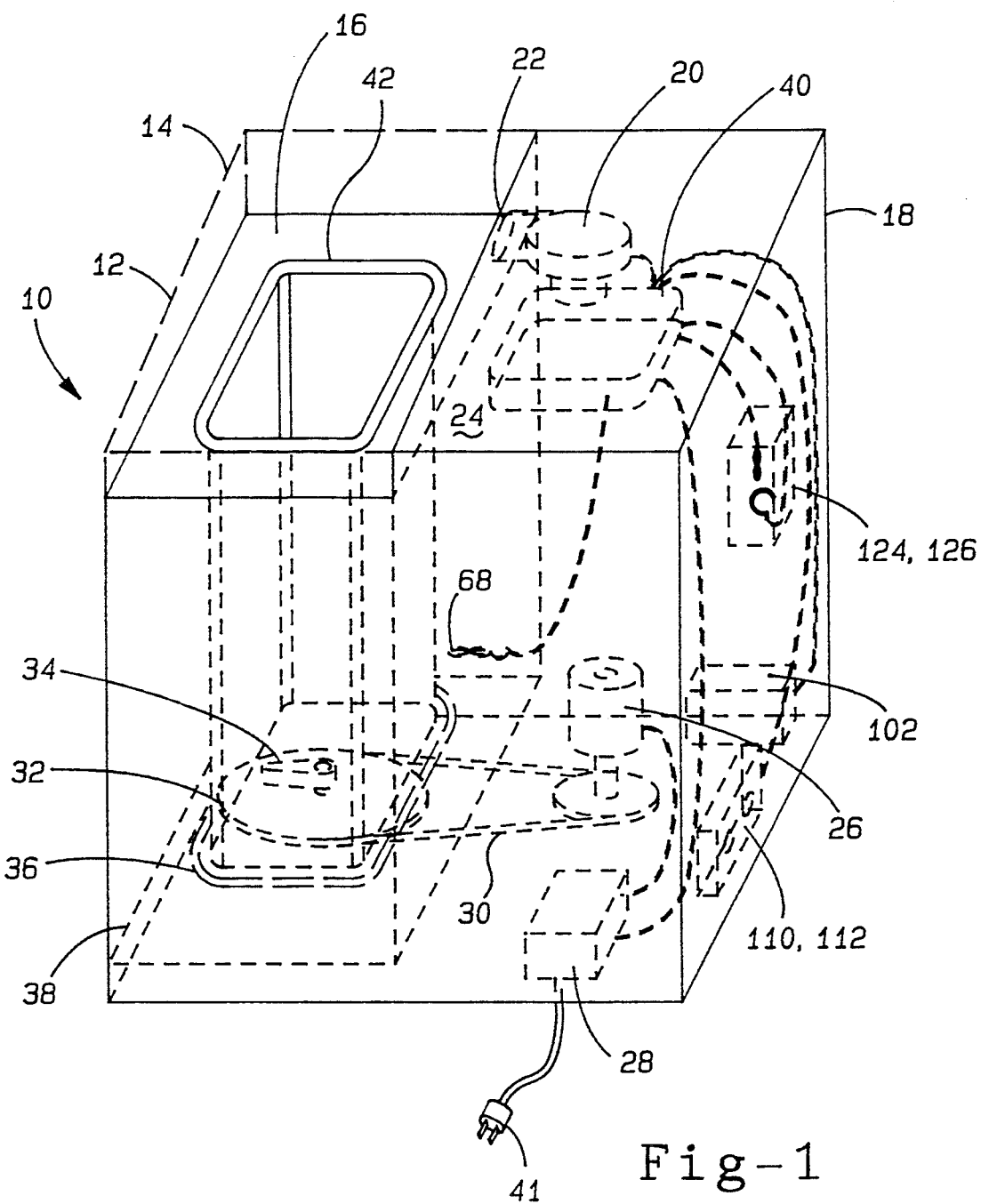
FIG. 1 is a perspective view of the automatic breadmaking machine of the present invention.

Referring to FIG. 1 an improved automatic breadmaking machine 10 according to the present invention is shown. The breadmaking machine is of a type generally known in the art and has a body 12 with a cover 14 attached to the body. The cover may be detachable from the body or may be hingedly connected by conventional means. The body 12 includes a baking chamber 16 within the body which is accessible by lifting the cover 14.

A compartment 18 of the body 12 is adjacent to the baking chamber 16. A blower motor 20 is mounted within the compartment 18 and generates a current of air which flows through an aperture 22 formed in a wall 24 separating the compartment 18 from the baking chamber 16 and circulates within the baking chamber 16. A kneading motor 26 is attached to the base of the compartment 18 and receives power from a motor controller 28. A pulley belt 30 is connected at one end to the kneading motor 26 and at the other end to a sheave 32 mounted within the baking chamber 16. A kneading bar 34 is mounted to the sheave 32 and rotates with the sheave upon actuation by the kneading motor 26 to knead the bread mixture contained in the baking chamber 16. A heater element 36 is also contained within a base 38 of the baking chamber 16 and generates the necessary temperature within the baking chamber 16 for baking the bread. A module 40 is mounted to the exterior of the body 12 and incorporates a controller, timer, display and keyboard. The module 40 enables information to be inputted into the breadmaking machine and both controls the operation of the breadmaker and displays information relevant to operation of the machine. A cord with an electric plug 41 may be inserted into any wall socket (not shown) to provide power to the machine 10.

The mixture of bread is thus held within a baking pan 42 and is placed within the baking chamber 16. The module 40 controls such functions as the current of air circulated by the blower motor 20, the operation of the kneading bar 34 and the operation of the heater element 36 to produce the desired bakery product.

Figure 2:
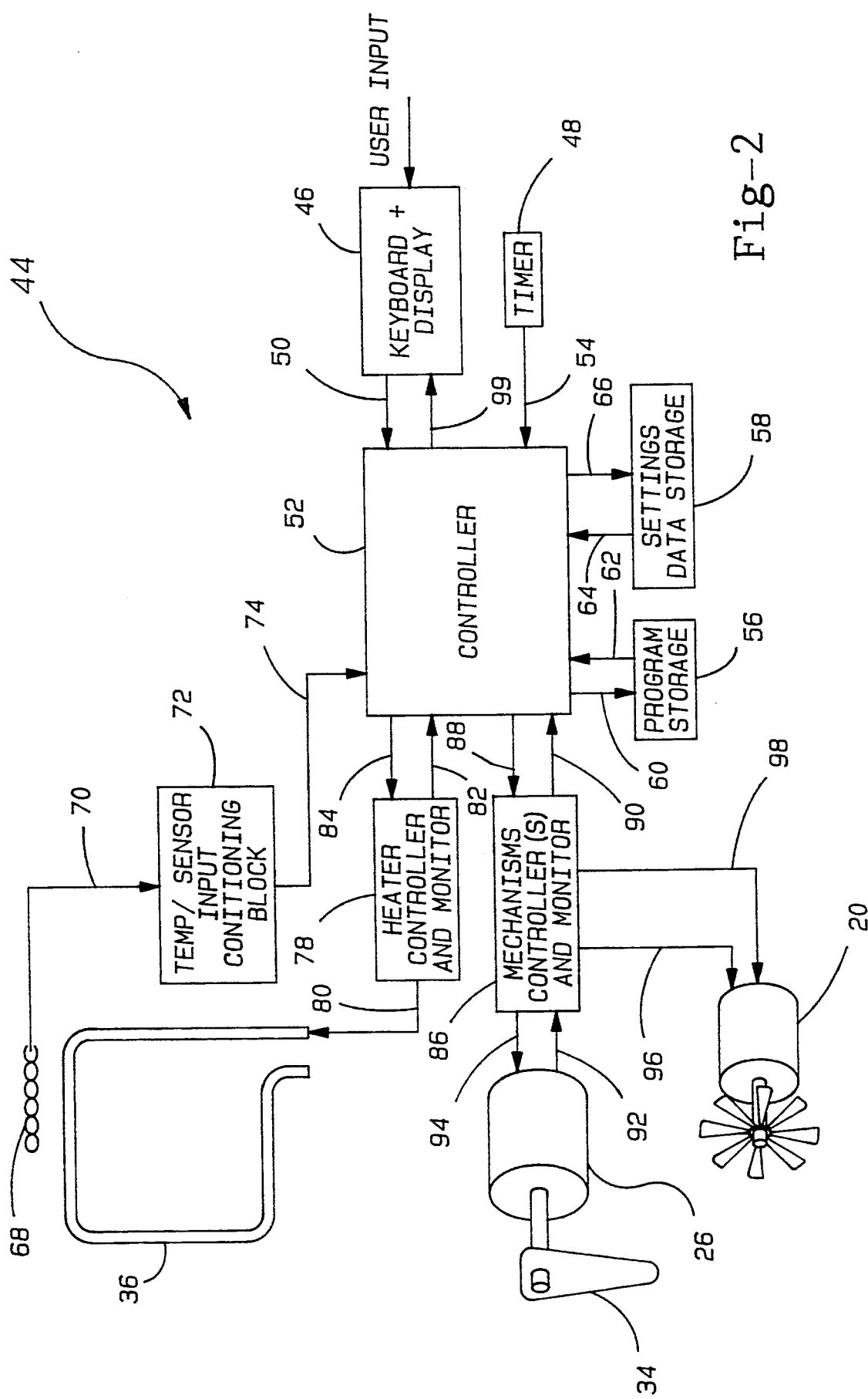
FIG. 2 is a diagrammatic view of a first preferred embodiment of the present invention illustrating the keyboard display for entering the atmospheric temperature and pressure inputs.

Having described the features of a conventional breadmaking machine a disclosure of the improvement of the present invention according to the following preferred embodiments will now be made. Referring to FIG. 2, a first preferred embodiment 44 of the breadmaking machine is diagrammatically shown. A keyboard/display panel 46 is provided for inputting values representing the atmospheric pressure and atmospheric temperature surrounding the breadmaking machine. The keyboard/display also displays values which are representative of bake time and temperature. A timer 48 preferably includes a clock and a timer function for assisting in the operation of the breadmaking machine. The functions of the keyboard/display 46 and timer 48, diagrammatically shown in FIG. 2, can be conveniently incorporated into the module 40 shown in the breadmaking machine according to FIG. 1.

Values representative of the atmospheric pressure and atmospheric temperature existing around the breadmaking machine are manually determined and are keyed into the keyboard/display 46 according to the first preferred embodiment. Additional values representative of baking time rise time and baking temperature are also inputted into the keyboard/display 46. According to the present invention these initial values are subsequently modified in response to the signal outputs representative of the atmospheric temperature and atmospheric pressure, as will now be described.

The values of the keyboard/display 46 representing the atmospheric temperature and atmospheric pressure are inputted along line 50 into a controller 52. The atmospheric temperature can be easily determined from a thermometer. The atmospheric pressure can be determined by a barometer or other means or by keying in the altitude at which the machine is located.

The controller 52 is preferably a microprocessor and includes conversion means located within the controller 52 for reading and converting the atmospheric temperature input and also for converting the altitude input into an atmospheric pressure value representative of the specified altitude. Clock functions relative to the timer 48 are also fed into the controller along line 54.

The conversion means of the controller 52 modifies the operational parameters of the breadmaking machine such as rise time baking time and baking temperature in response to the temperature and pressure inputs. The conversion means may consist of one or more look-up tables for converting the pressure and temperature input values into output values for modifying the operation of the breadmaking machine. The look-up tables contain compensating values for operating the machine which are the result of trial and error experimentation.

Alternatively, a combined temperature and pressure look-up table may be utilized in place of separate look-up tables. The combined table outputs a single value in response to a pair of inputs representing temperature and pressure values for each parameter cycle, such as bake time and rise time. Multiple tables may be used if more than one cycle parameter needs to be determined.

Finally, a numerical algorithm may be incorporated into the breadmaker controller 52 for running the temperature and pressure values and for generating output values for the cycle parameters.

The means for accomplishing the above functions are provided by a program storage 56 and a settings data storage 58 which are both electrically connected to the controller 52. The signals read by the controller 52 which are representative of the atmospheric pressure and temperature are outputted along line 60 into the program storage 56. The program storage determines whether a look-up table is referenced for determining a cycle value or whether a numerical algorithm is run to determine cycle parameters. The desired information from the program storage 56 is outputted to the controller along line 62.

Once the controller has run the desired setting input program at least one output signal is sent along line 64 to the settings data storage 58. The appropriate output value or values are then sent back to the controller along line 66 which will cause the controller to modify the output parameters of the machine, as will be subsequently described.

An oven temperature sensor 68 is located within the baking chamber of the machine and outputs a signal along line 70 which is representative of the oven temperature. The signal is received by a temperature sensor input conditioning block 72 which converts the analog signal to a digital signal. The block 72 may combine the functions of an amplifier, frequency selector filter and reference cold junction. The signal is then outputted on line 74 into the controller 52.

Based upon the information provided by the oven temperature signal 74 and the output signal or signals 66 from the settings data storage 58 the controller is capable of adjusting the operation of the breadmaking machine to compensate for atmospheric temperature and atmospheric pressure disparities existing in the environs surrounding the machine.

In operation, a heater controller and monitor block 78 is operatively connected to the heating element 36 by line 80. A signal is outputted along line 82 from the heater controller and monitor block 78 to the controller 52. The signal is representative of the current level at which the heater element is operating. Based upon the input on line 82 and the calculations of the controller 52, an output value 84 is issued by the controller along line 84 to the heater controller and monitor block 78. The output value is a correction value which modifies the current applied to the heater element 36 to adjust the element 36 temperature in response to the changes in atmospheric temperature and pressure.

A controller/monitor block 86 is also connected to the controller 52 by an input line 88 to the controller and an output line 90 from the controller. The controller/monitor block 86 supplies values to the controller 52 which are representative of the operation of the kneading motor 26 and the blower motor 20. The kneading motor 26 is connected to the block 86 by an output line 92 to the block 86 and an input line 94 from the block 86 to the kneading motor 26. Likewise, the blower motor 20 is connected to the block 86 by an output line 96 to the block 86 and an input line 98 from the block 86 to the blower motor 20.

The monitor 86 receives input signals from the kneading motor along line 92 and the blower motor along line 96 which are representative of the power levels of the motors. The signals are converted by the monitor into a format which is understood by the controller and are outputted to the controller along line 88. Again, the controller compares the values with the compensation values determined from the data storage 58. The controller then outputs back to the monitor 86 the compensating values as signals along line 90 which account for the changes in atmospheric temperature and pressure. The monitor 86 converts the values back to the appropriate form and then outputs them to the kneading motor and the blower motor along lines 94 and 98, respectively. The signals along lines 94 and 98 preferably adjust the current feed to the motors 26 and 20 to thereby adjust the operation of the motors to compensate for the disparities created by the atmospheric temperature and pressure. The controller 52 can also correct the readout of the display 46 to account for the correction values by outputting a signal on line 99.

Figure 3:
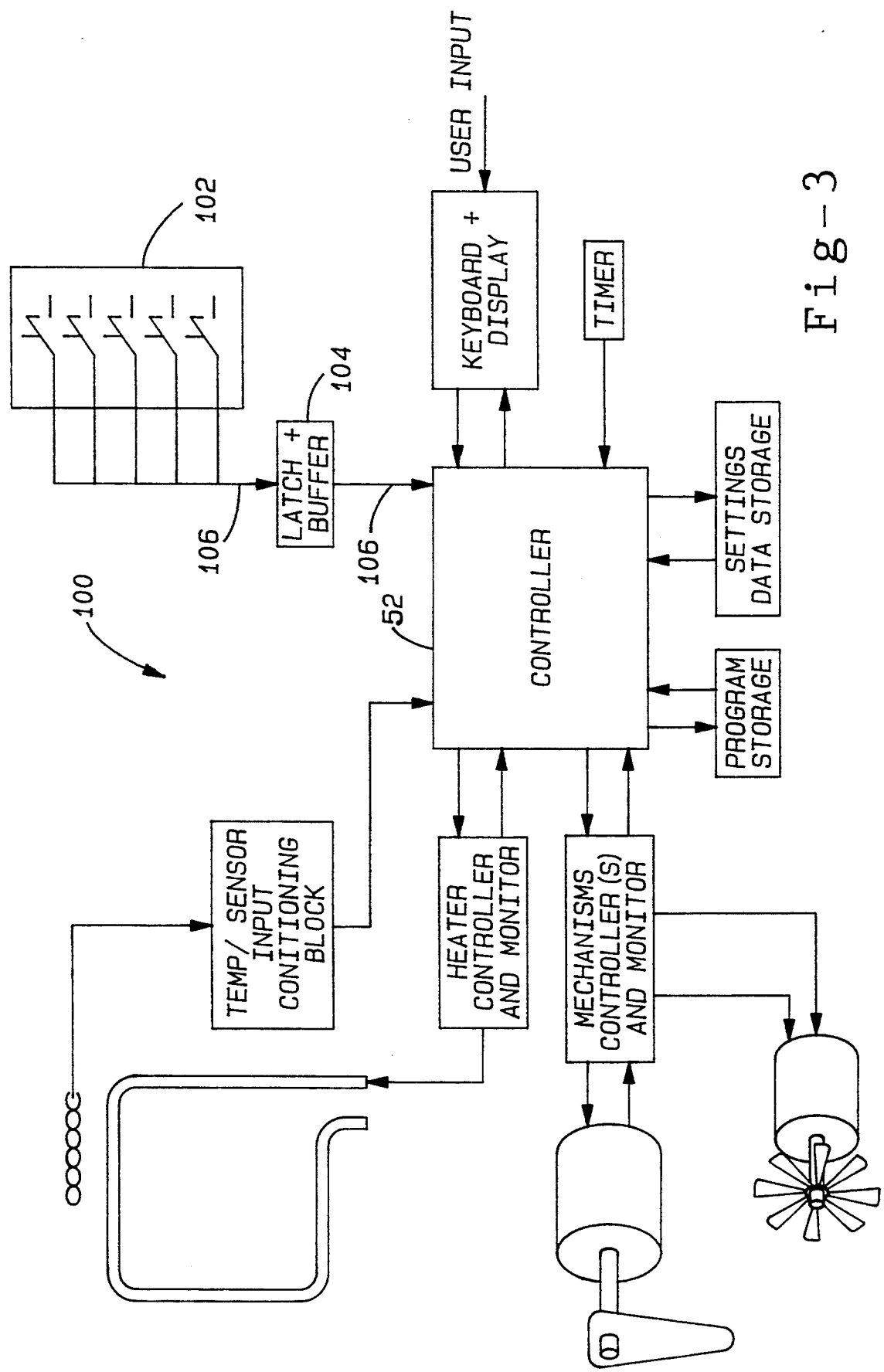
FIG. 3 is a diagrammatic view of a second preferred embodiment of the present invention and showing the switch block inputs for reading and inputting the atmospheric temperature and pressure.

Referring to FIG. 3 a second preferred embodiment 100 of the improved breadmaking machine of the present invention is shown in diagrammatic form. The present invention according to the preferred embodiment 100 is identical in all respects to the embodiment 44 of FIG. 2, with the exception of the manner of sensing and inputting the signals representative of the atmospheric pressure and/or atmospheric temperature into the controller 52.

A multiple position switch block 102 (see also FIG. 1) includes a plurality of switches with different switches corresponding to different altitude (pressure) and temperature ranges. The switch block is connected to a latch and buffer block 104 by a line 106 which separately connects with each of the plurality of switches on the switch block 102 and extends to the buffer block 104. The controller 52 reads the inputs from the latch and buffer block 104 along line 107.

Signals representing the setting of the altitude/pressure and temperature switches are outputted to the latch and buffer block 104. The block 104 converts the switches to a language, preferably digital, which can be read by the controller 52. The signal output of the block is then sent along line 106 to the controller 52. Once the controller 52 receives the signal input from the switch block, the calculation and data retrieval steps previously described are then undertaken to determine the compensation parameters for adjusting the operational output of the breadmaker features, such as the heater element, kneading motor and blower motor.

Figure 4:
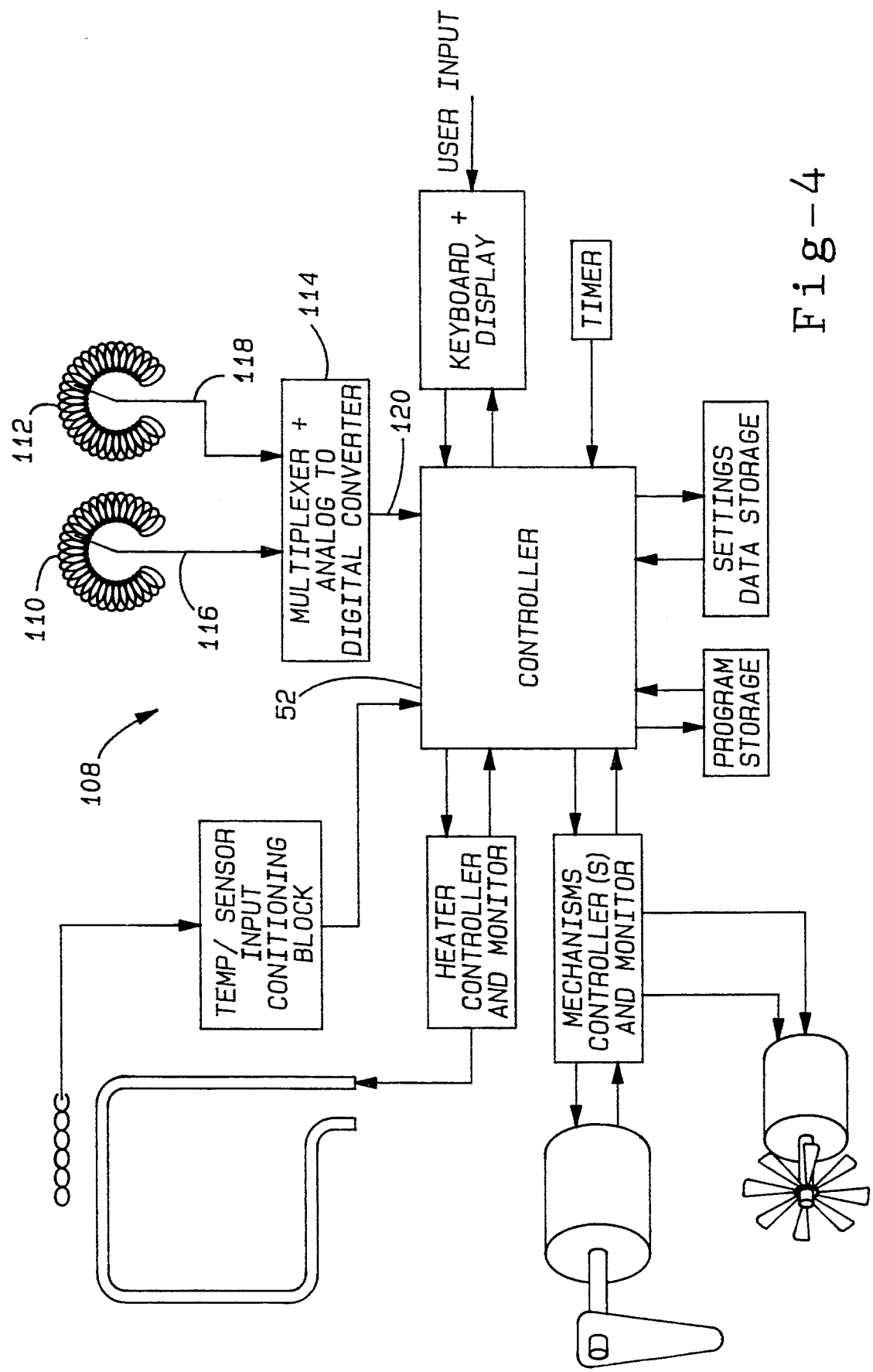
FIG. 4 is a diagrammatic view of a third preferred embodiment of the present invention and showing the input potentiometers for reading and inputting the atmospheric temperature and pressure.

Referring further to FIG. 4 a third preferred embodiment 108 of the present invention is thereshown and includes an input potentiometer 110 for reading the altitude to determine atmospheric pressure. An input potentiometer 112 is also provided for reading atmospheric temperature. A multiplexer with analog/digital converter 114 is connected to the potentiometer 110 by line 116 and to the potentiometer 112 by line 118. The potentiometers 110, 112 are both continuously variable and have an infinite number of settings which correspond to the atmospheric temperature and atmospheric pressure. The output signal of potentiometer 110 is sent to the multiplexer/converter 114 along line 116 and is monotonically related to altitude. The output signal of potentiometer 112 is sent to the multiplexer/converter 114 along line 118 and signifies the atmospheric temperature outside the breadmaking machine.

The converter 114 issues digital output signals to the controller 52 along line 120 and the controller 52 proceeds to perform the calculation and data retrieval steps to modify the breadmaker's operating parameters.

Figure 5:
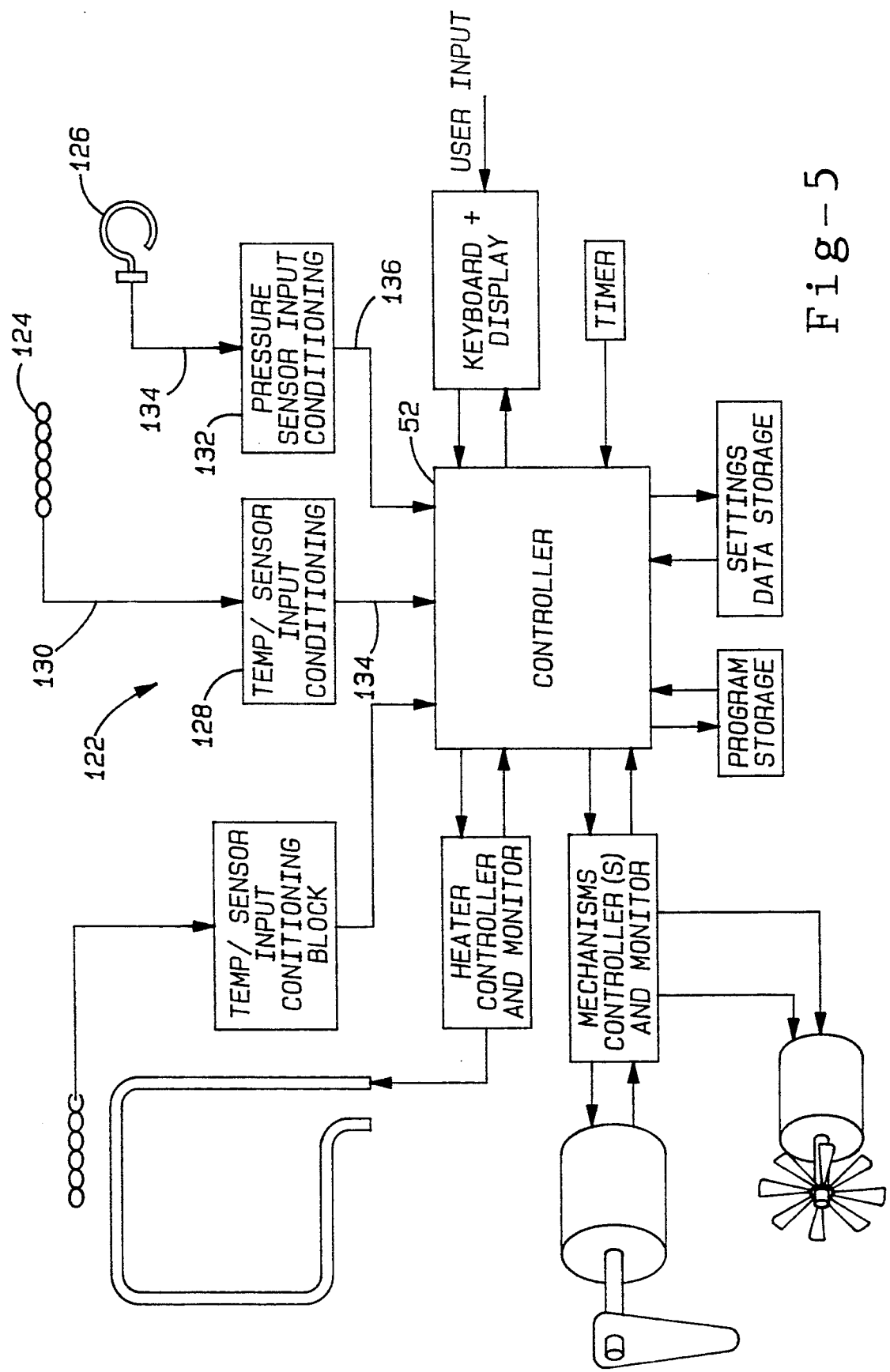
FIG. 5 is a diagrammatic view of a fourth preferred embodiment of the present invention and showing the sensors for reading and inputting the atmospheric temperature and pressure.

According to FIG. 5 a fourth preferred embodiment 122 of the present invention is shown and includes an atmospheric temperature sensor 124 and an atmospheric pressure sensor 126. The temperature sensor 124 is connected to a temperature sensor input conditioning block 128 by line 130. Likewise the pressure sensor 126 is connected to an absolute pressure sensor input conditioning block 132 by line 134.

The atmospheric temperature sensor 124 is preferably a thermistor, thermocouple, platinum resistance thermometer or other conventional temperature sensing element. A signal representative of the atmospheric temperature is issued from the sensor 124 along line 130 and is received by the temperature conditioning block 128. The conditioning block 128 converts the signal to a language readable by the controller 52, preferably digital and outputs a signal along a line 135 connecting the conditioning block 128 with the controller 52.

The absolute pressure sensor is calibrated to the atmospheric pressure ranges corresponding from sea level to the highest populated altitude. A signal representative of the absolute pressure is outputted on line 134 to the pressure sensor input conditioning block 132. The conditioning block 132 converts the pressure signal into a range setting or into a value representative of a given altitude. An output signal is issued by block 132 along a line 136 connecting the block 132 with the controller 52. The controller 52 then performs the analysis and data retrieval steps as previously described.

Figure 6A:
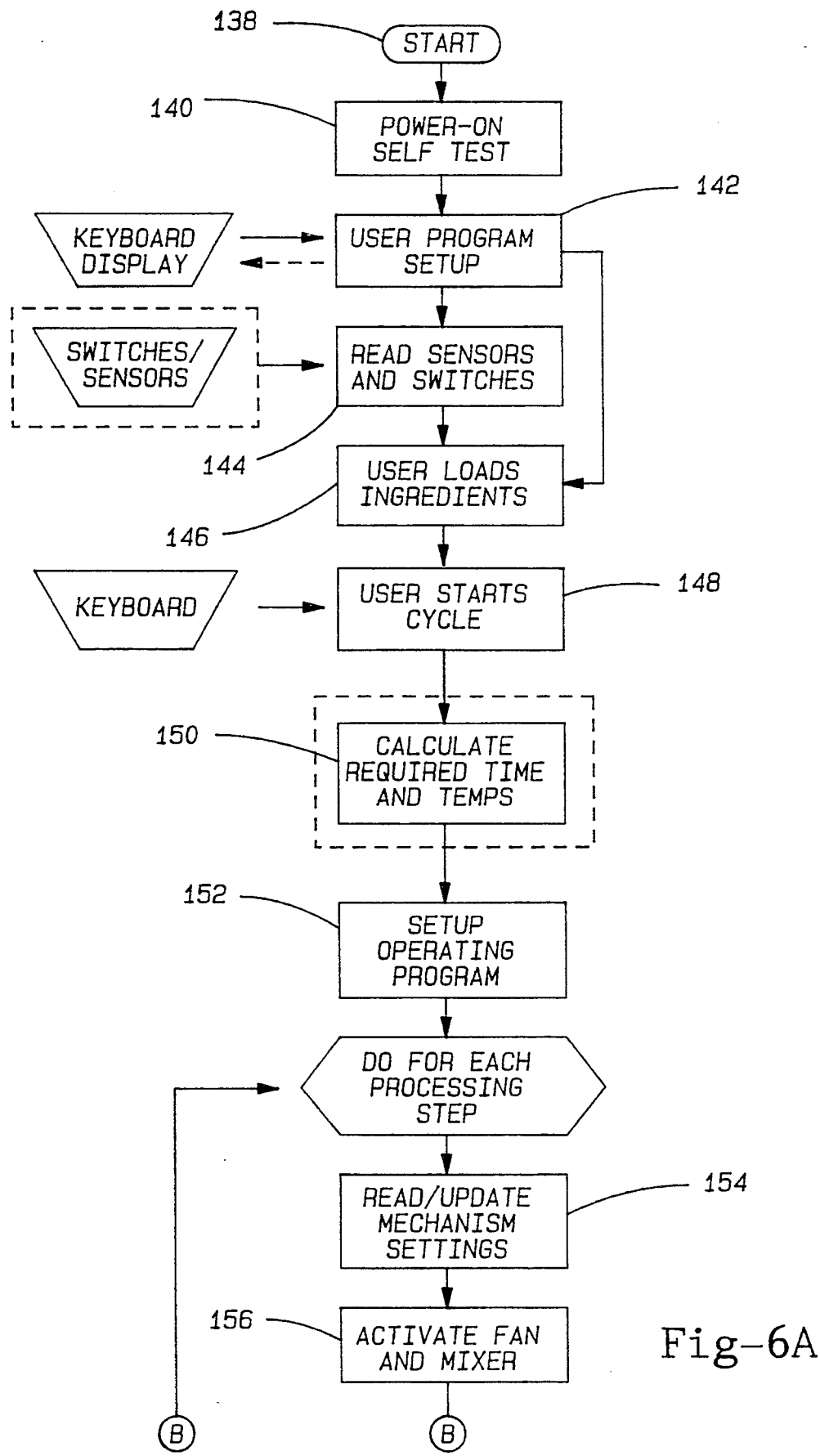
FIG. 6 is a flow chart showing the operation of the breadmaking machine according to the present invention.
Figure 6B:
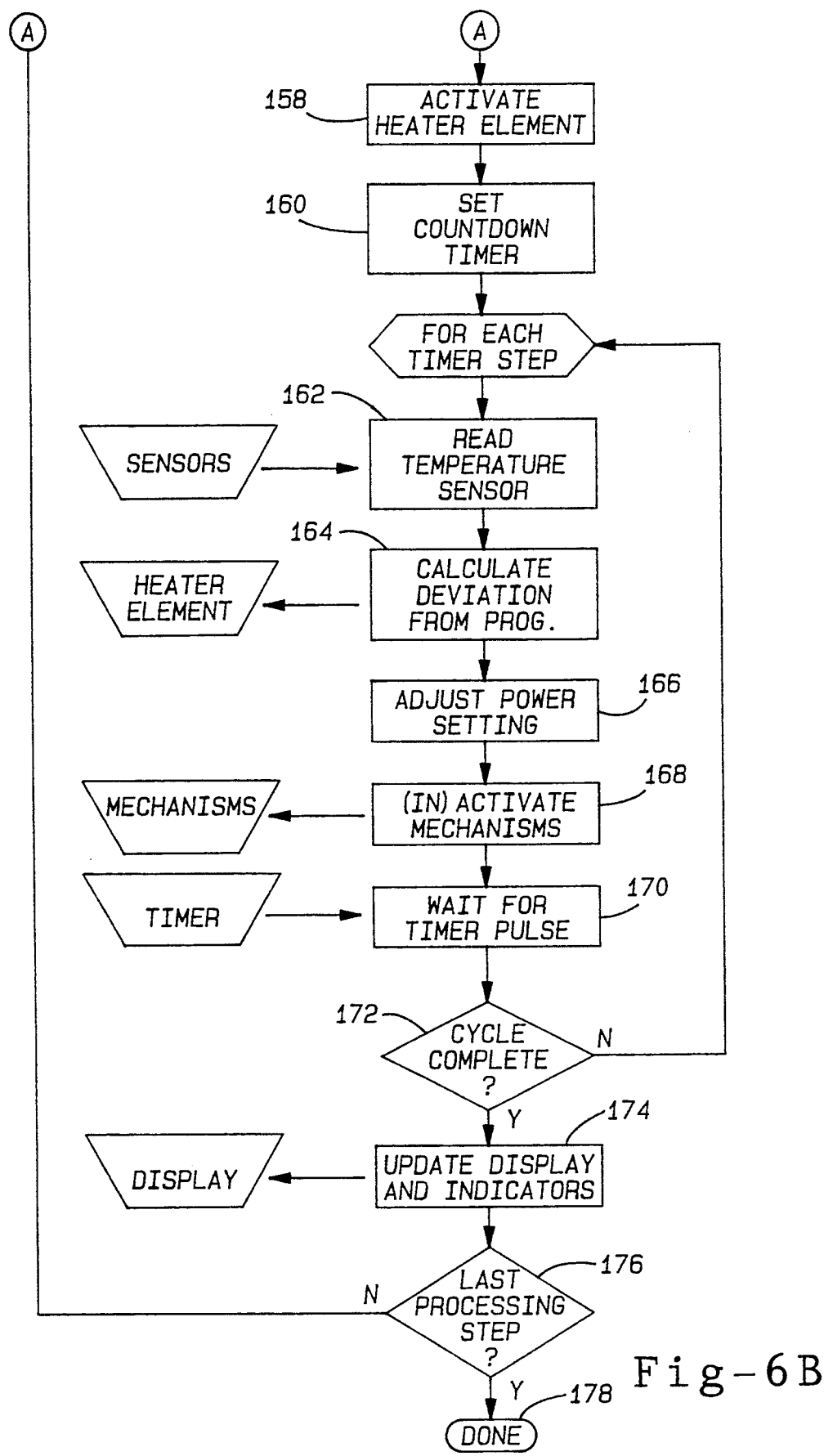

Referring to FIG. 6, a control flowchart for explaining the steps of the breadmaking machine according to the preferred embodiments is thereshown. The program is initiated at start position 138. Power-on self test step 140 follows step 138 and in turn leads to user program setup 142. Setup 142 signifies the entry of all the information necessary to establish a given baking time, rise time, and baking temperature for a desired type of bread.

Keyboard display, shown diagrammatically in FIG. 2, can interface with the user program setup 142 to permit the operator to key in the atmospheric temperature and atmospheric pressure variables. In the event that the temperature and pressure data is key entered on the keyboard, the user program setup step proceeds directly to step 146 where the user loads the ingredients into the breadmaking machine. Otherwise, the controller reads the sensor, switch block assembly, or potentiometers at step 144 according to one of the further preferred embodiments. Sensor input step then proceeds to the ingredient loading step 146.

Step 148 signifies the start of the baking cycle. Additional information may be entered at this point from the keyboard display which is representative of the normal bake time and temperature, not taking into account the compensation to be made for the atmospheric temperature and pressure. Step 150 signifies the calculation of the required baking time and temperature according to the variants previously disclosed. Step 150 leads to setup operating program step 152. Step 152 proceeds to read/update mechanism settings step 154 in which the controller determines the settings of the heater element, kneading motor and blower motor.

At step 156 the fan and mixer are activated. At step 158 the heater element is activated. Step 160 signifies the setting of the countdown timer which represents the normal baking time prior to adjustment by the controller. At step 162 the oven temperature sensor is read and is compared to readings of the atmospheric temperature and atmospheric pressure by the controller. Step 164 signifies the calculation of the deviation from the program accounting for the disparities in atmospheric pressure and atmospheric temperature.

The power setting of the heater element of the machine is adjusted at step 166. At step 168 the kneading motor and blower motor are both adjusted according to the deviation in the program. At step 170 the timer issues a timer pulse to advance a baking cycle, such as bake time or rise time.

Step 172 asks if the cycle is completed. If not the program goes back to step 162 to continue the cycle. If yes the program proceeds to update display and indicator step 174 in which the bake time and cycle of the machine are displayed. Step 176 asks if the last processing step has been completed. If no the program goes back to step 154 to start a new cycle. If yes the program proceeds to finish step 178.

Having described my invention additional preferred embodiments will become apparent to those skilled in the art to which it pertains without deviating from the scope of the invention as set forth in the appended claims.

I claim:

1. An improved automatic breadmaking machine for producing bakery products, the improvement comprising:
    means for sensing an atmospheric pressure external from said breadmaking machine;
    means for sensing an atmospheric temperature external from said breadmaking machine; and
    a controller for reading said atmospheric pressure and said atmospheric temperature and for modifying the operation of at least one operational parameter of said breadmaking machine in response to said atmospheric pressure and said atmospheric temperature.

2. The breadmaking machine as described in claim 1, wherein said means for sensing the atmospheric pressure and means for sensing the atmospheric temperature comprises a multiple switch block assembly having a first plurality of switches calibrated to different atmospheric temperature ranges and a second plurality of switches calibrated to different atmospheric pressure ranges.

3. The breadmaking machine as described in claim 1, wherein said means for sensing the atmospheric pressure and means for sensing the atmospheric temperature comprises a pair of continuously variable input potentiometers, one of said potentiometers being calibrated to the atmospheric temperature and the other of said potentiometers being calibrated to the atmospheric pressure.

4. The breadmaking machine as described in claim 1, wherein said means for sensing the atmospheric pressure and means for sensing the atmospheric temperature comprises an atmospheric temperature sensor and an atmospheric pressure sensor.

5. The breadmaking machine as described in claim 1, wherein said controller is a microprocessor capable of reading input signals representative of the atmospheric pressure and atmospheric temperature, said controller modifying the operation of at least one parameter of said breadmaking machine in response to a calculated deviation in a breadmaking program programmed into said machine as a result of the atmospheric pressure and temperature.

6. The breadmaking machine as described in claim 1, further comprising a program storage block communicating with said controller, said program storage containing an algorithm program for calculating a deviation of a breadmaking program in response to the atmospheric temperature and the atmospheric pressure inputs.

7. The breadmaking machine as described in claim 1, further comprising a settings data storage block communicating with said controller said data storage providing said controller with values for modification of a breadmaking program in response to said atmospheric temperature and said atmospheric pressure inputs.

8. The breadmaking machine as described in claim 1, wherein said controller further comprises at least one look-up table for providing an output value for modifying said at least one operational parameter.

9. The breadmaking machine as described in claim 1, wherein a numerical algorithm may be incorporated into said controller for generating an output value for modifying said at least one operational parameter.

10. The breadmaking machine according to claim 5, wherein said operational parameter further comprises a heater element.

11. The breadmaking machine according to claim 5, wherein said operational parameter further comprises a kneading motor.

12. The breadmaking machine according to claim 5, wherein said operational parameter further comprises a blower motor.

* * * * *